(12) United States Patent
Lamar et al.

(10) Patent No.: US 6,410,851 B1
(45) Date of Patent: Jun. 25, 2002

(54) MOUNTING SYSTEM FOR ELECTRICAL WIRING BOXES

(75) Inventors: Donald F. Lamar, Fort Wayne, IN (US); Spencer L. Mackay, Agoura Hills; Richard F. M Conroy, Simi Valley, both of CA (US); Donald J. Brody, South Bend, IN (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/626,141

(22) Filed: Jul. 26, 2000

Related U.S. Application Data

(60) Provisional application No. 60/146,314, filed on Jul. 29, 1999.

(51) Int. Cl.[7] .................................................. H02G 3/14
(52) U.S. Cl. ........................... 174/67; 174/66; 220/241; 220/242; 336/67; 411/522
(58) Field of Search ............................. 174/66, 67, 58, 174/53, 57; 220/241, 242, 3.2, 3.8; 336/98, 68, 105, 67; D8/353; D13/177; 411/522

(56) References Cited

U.S. PATENT DOCUMENTS

| | | | | |
|---|---|---|---|---|
| 1,984,278 A | * | 12/1934 | Nero | 174/66 X |
| 3,659,036 A | * | 4/1972 | Silver | 174/58 |
| 3,965,287 A | * | 6/1976 | Mueller | 174/66 |
| 5,009,610 A | * | 4/1991 | Woskow | 439/136 |
| 5,170,013 A | | 12/1992 | Borsh et al. | 174/53 |
| 5,170,014 A | | 12/1992 | Borsh | 174/53 |
| 5,571,995 A | * | 11/1996 | Pierce | 174/66 |
| 5,594,205 A | | 1/1997 | Cancellieri et al. | 174/53 |
| 5,594,208 A | | 1/1997 | Cancellieri et al. | 174/58 |
| 6,144,562 A | * | 11/2000 | Voelzke et al. | 174/52.1 X |

* cited by examiner

Primary Examiner—Dean A. Reichard
Assistant Examiner—Dhiru R Patel
(74) Attorney, Agent, or Firm—Garrett V. Davis; Alfred N. Goodman

(57) ABSTRACT

A mounting system for use in an electrical housing or junction box provides a tactile indication to the installer that the housing is properly installed. The mounting system includes a keyhole shaped opening in a wall of the housing. The keyhole-shaped opening has a smaller section dimensioned to receive a shaft of a fastener and larger section to receive the head of the fastener. A neck portion between the smaller and larger sections has a width less than a width of the fastener shaft to provide interference as the fastener slides between the larger and smaller sections. In one embodiment, the neck portion is formed by two flexible arms extending into the opening. The housing is positioned over the head of the mounting member and repositioned so that the shank of the fastener slides between the two arm members. In so doing, the arm members flex outwardly, and then snap back into place after the shank is fully and properly seated in the smaller section of the keyhole shaped opening. The snap gives the installer a tactile indication that the housing is positioned and mounted properly.

36 Claims, 4 Drawing Sheets

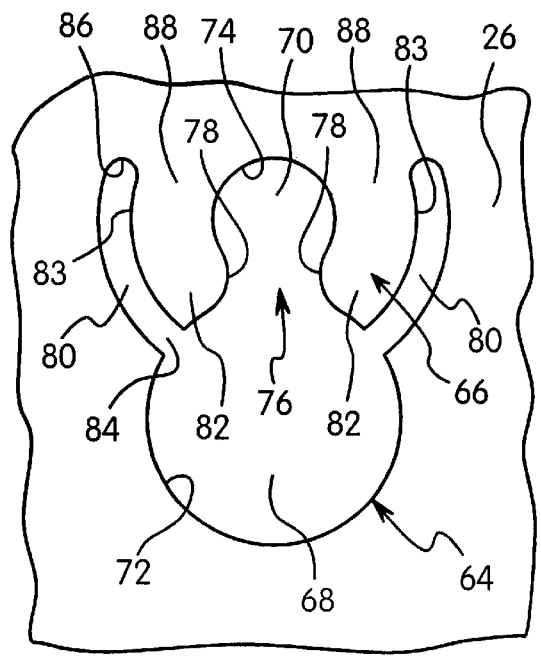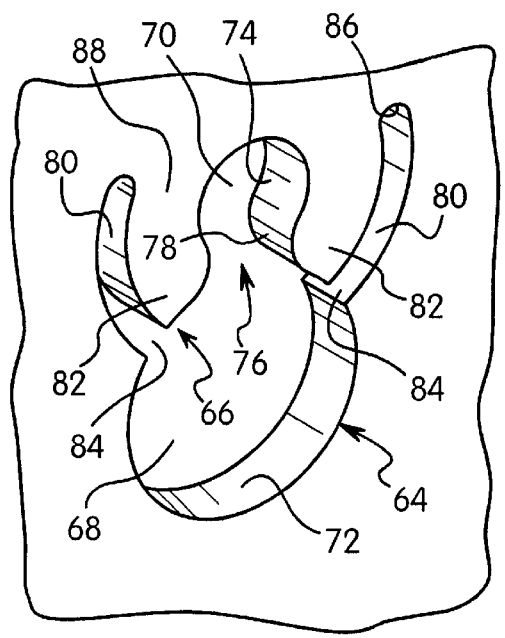
Fig. 5    Fig. 6
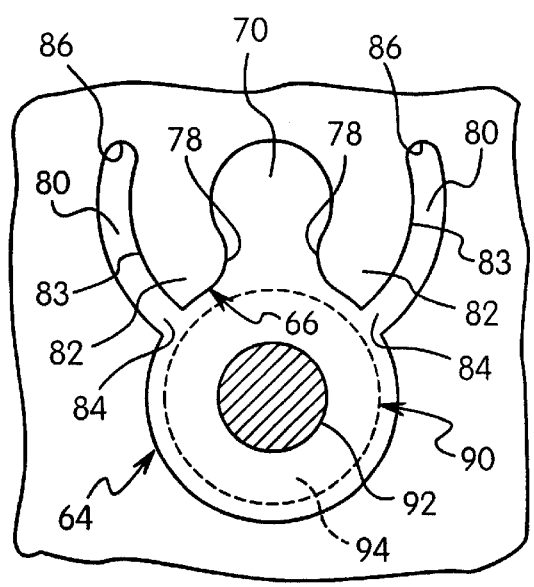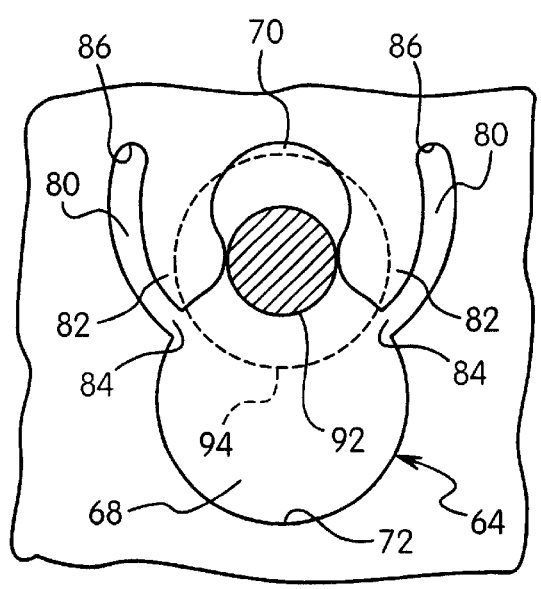
Fig. 7    Fig. 8

MOUNTING SYSTEM FOR ELECTRICAL WIRING BOXES

CROSS-REFERENCE TO RELATED APPLICATION

This application claims the benefit under 35 U.S.C. § 119(e) of provisional application Ser. No. 60/146,314, filed Jul. 29, 1999, which is hereby incorporated by reference in its entirety.

FIELD OF THE INVENTION

The present invention relates to a mounting system for a mounting member and particularly for an electrical junction box. The invention is also directed to a housing having a coupling system for coupling and mounting the housing to a wall or other structural member.

BACKGROUND OF THE INVENTION

Various systems for attaching electrical junction boxes or electrical component housings are well known in the art. Widely known in the art are junction boxes that include the conventional "keyhole shaped" openings for receiving and retaining screws or similar mounting members. The head portion and part of the shank of the screws typically extend from the wall or support structure to which the junction box is to be mounted. The larger portion of the keyhole shaped opening allows the head of the screw to pass through. The housing is then repositioned so that the shank of the screw slides between the two edges that define the narrow portion of the keyhole. By use of several of such keyhole openings, a junction box can be mounted flush with a mounting surface.

The edges of the narrow portion of the conventional keyhole are typically spaced to firmly receive the shank of the screw or other fastener. However, the installer cannot determine whether the screw has been properly received and positioned into the narrow portion of the keyhole openings since the narrow portion has a uniform width. For example, the junction box may "feel" as though the screws are correctly positioned within the openings when such is not the case.

U.S. Pat. No. 3,659,036 to Silver discloses a junction box with a mounting clip for mounting the box to a support using a mounting screw. The clips are formed from a resilient material and include a circular portion and a pair of parallel flexible legs that extend from the circular portion. The legs can be flexed and snapped into apertures in the box to enable the clips to pivot from a retracted position to an extended position for mounting the box. The clips extend outward from the edge of the box and lie against the support to receive a fastener.

U.S. Pat. No. 5,594,205 to Cancellieri et al. discloses a molded plastic outlet box having an opening for fitting a threaded fastener within a slotted boss extending through the opening. The slot enables the bottom wall to flex out of the plane of the bottom wall so that the opening can expand slightly as the fastener is inserted therein.

U.S. Pat. Nos. 5,170,013 and 5,170,014 to Borsh et al. also disclose a box with slotted push-in type screw receiving openings, having slots to allow the openings to expand slightly. The box is formed with two opposing flaps defining a slot between the ends of the flaps. One end of each flap is hinged to the box. The free end of the flaps are formed with a semicircular recess. The two semicircular recesses together form a circular opening for the screw. The slot between the ends of the flaps allows the flaps to pivot out of the plane of the box to enable the fastener to pass through the hole and between the flaps.

These devices are generally effective for their intended purpose. However, there is a continuing need in the industry for improved mounting systems for various devices.

SUMMARY OF THE INVENTION

The present invention is directed to a system for mounting a device to a support surface. More particularly, the invention is directed to a device with an indicator for indicating that the device is properly mounted on a fastener.

Accordingly, a primary object of the invention is to provide a mounting surface with an opening for receiving a mounting member where the opening includes an indicator for indicating that the mounting member is securely positioned in the opening.

Another object of the invention is to provide a support member having a mounting hole, where the mounting hole has a first portion dimensioned to receive the head of a fastener, a second portion to receive the shaft of the fastener and an indicator to indicate movement of the shaft between the first and second portions of the hole.

A further object of the invention is to provide a mounting surface having an opening for a mounting member, where the opening has a snap member for indicating sliding movement of a fastener between a removable position and a locked position.

Still another object of the invention is to provide a device having a mounting wall with a plurality of keyhole shaped holes for receiving the head of a fastener and allowing sliding movement to a secured position in the slots, where the mounting surface further includes an indicator for providing a tactile sensation as the fasteners slide into the secured position.

A further object of the invention is to provide a mounting wall having an opening for a fastener, where the opening has a constricted area defining an indicator for indicating that the fastener is in a securing position.

Another object of the invention is to provide a housing with a mounting wall having an opening for a mounting fastener, and where the mounting wall includes at least one cantilevered arm extending into the opening and being sufficiently resilient to flex in a plane of the mounting wall.

A further object of the invention is to provide a mounting wall with an opening for receiving a mounting member, where the mounting wall includes two opposing arms extending into the opening to provide an indicator for indicating when the mounting member slides between first and second positions in the opening.

The objects of the invention are basically attained by providing a support member comprising a mounting wall having an opening dimensioned for receiving a fastener for mounting the support member to a support surface. The fastener has a shank and a head. The opening has a substantially keyhole shape with a first portion having a dimension to receive the head and a second portion having a dimension to receive the shank. The second portion has a dimension less than the dimension of the first portion. The wall further has at least one arm extending into the opening and positioned at a juncture between the first portion and the second portion to form a constricted area having a width less than a width of the shaft. The arm is sufficiently flexible to allow the shaft to slide in a plane of the opening between the first portion and the second portion.

The objects of the invention are further attained by providing a support for electrical components, comprising a housing having a mounting wall with at least one opening dimensioned to receive a mounting member for coupling the housing to a support surface, and at least one arm integrally formed with the housing and extending into the at least one opening. The arm is sufficiently flexible to flex as the mounting member passes between the arm and a side edge of the opening.

The present invention provides a device that can easily be installed over a mounting member extending from a surface to which the device is to be mounted. At least one opening is provided in a mounting surface of the device that includes a pair of deformable arm members. The arm members flex outwardly as the shank of the mounting member is received therebetween and provide a tactile sensation to the installer that the device is installed in the proper position.

In one embodiment, the present invention provides a housing for electrical components. The housing includes a housing body having a mounting surface with an opening to receive a mounting member. A yieldable arm member is integrally formed with the housing and extends into the opening. The yieldable arm member provides a tactile sensation when the housing is secured to the mounting member.

In one embodiment of the invention, an opening in a mounting surface includes a pair of arm members are provided, each of which engages an opposite side of the mounting member. The arm members are resilient toward one another and shaped so that a "snap-tight" feel is provided when the shank portion of the mounting member is received therebetween. The opening includes first and second sections, where the first section is larger than said second section and is adapted to receive a head portion of the mounting member therethrough. The second section includes the arm members. The opening defines a keyhole shaped periphery.

The objects, advantages, and other salient features of the invention will become apparent to one skilled in the art in view of the following detailed description of the invention and the attached drawings, which form a part of this original disclosure.

BRIEF DESCRIPTION OF THE DRAWINGS

The following is a brief description of the drawings in which:

FIG. 5 is a top plan view of the mounting hole in a preferred embodiment of the invention;

FIG. 6 is a perspective view of the mounting hole of FIG. 5;

FIG. 7 is a top plan view of the mounting hole showing a fastener in cross-section extending through the mounting hole in a first position;

FIG. 8 is a top plan view of the mounting hole showing the fastener in cross-section passing between the neck of the opening;

DETAILED DESCRIPTION OF THE INVENTION

The present invention is directed to a system for mounting a device to a wall or other support structure. More particularly, the invention provides a mounting system having an indicator for indicating the position of the mounting member with respect to the device.

Figure 1:
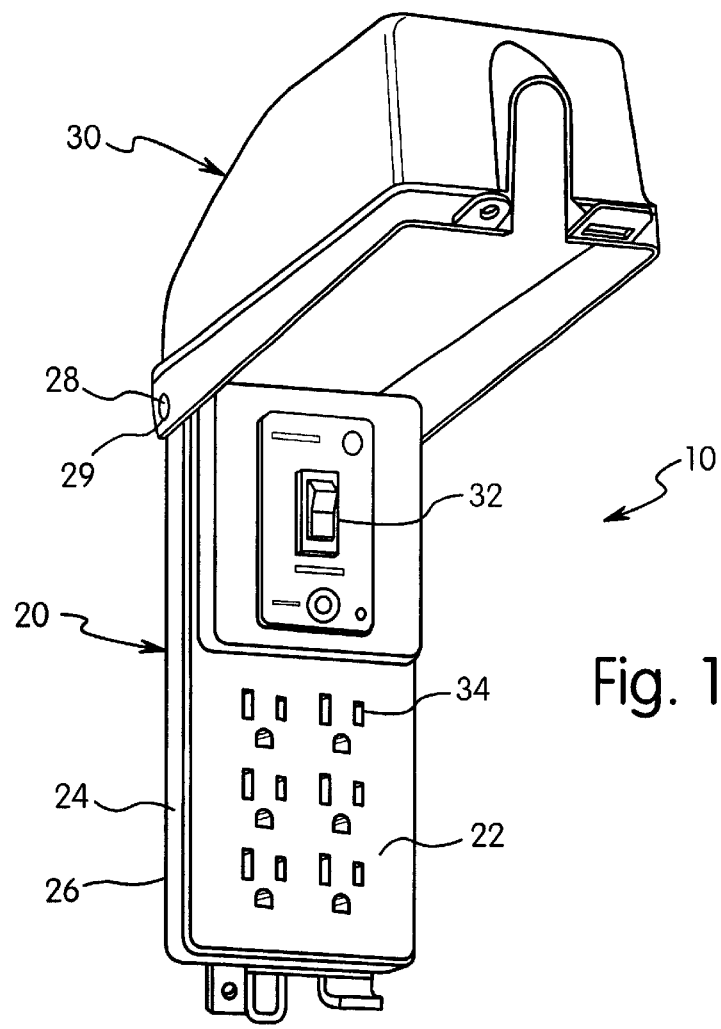
FIG. 1 is a perspective view of the device in one embodiment of the invention.
Figure 3:
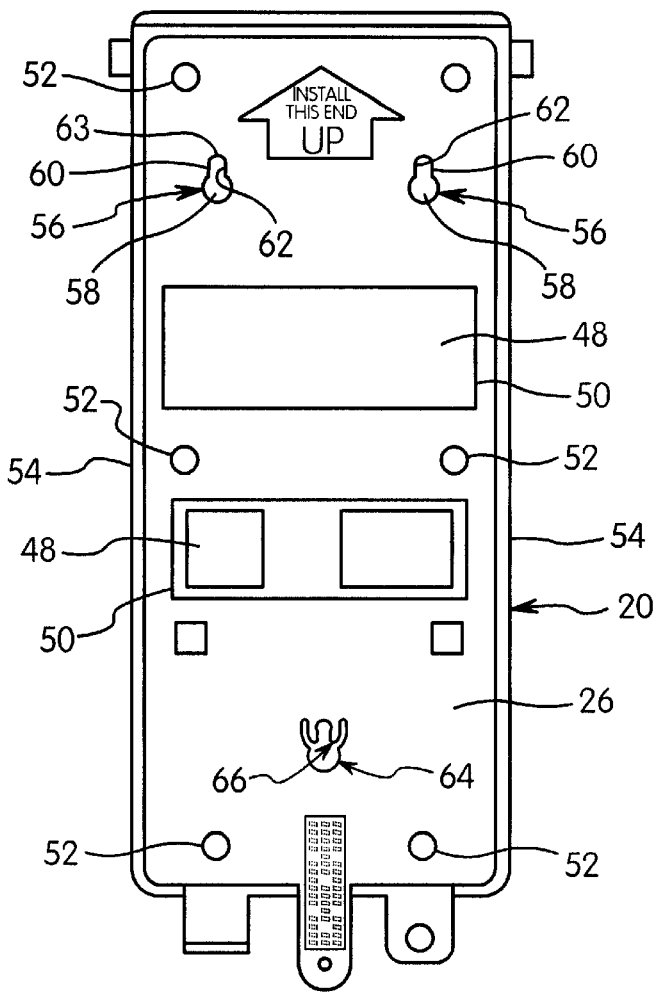
FIG. 3 is a bottom view of the device of FIG. 1 showing the mounting holes of the housing.

The mounting system of the invention can be used in connection with various devices that are to be mounted to a wall or other support surface. In preferred embodiments, the mounting system is used with an assembly 10 as shown in FIGS. 1 and 3. Assembly 10 in this embodiment is an electrical device having a housing 20 with a top wall 22, side walls 24 and a bottom wall 26 as shown in FIG. 3. Pivot pins 28 extend outwardly from side walls 24 and extend through openings 29 in a cover 30 to pivotally connect cover 30 to housing 20.

Figure 2:
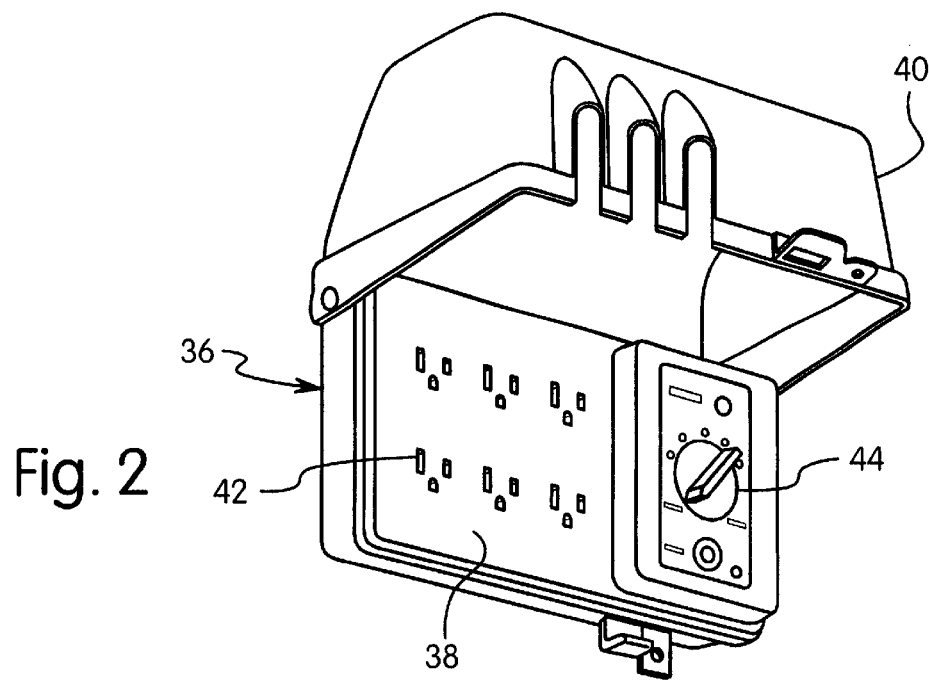
FIG. 2 is a perspective view of the device in a second embodiment of the invention.
Figure 4:
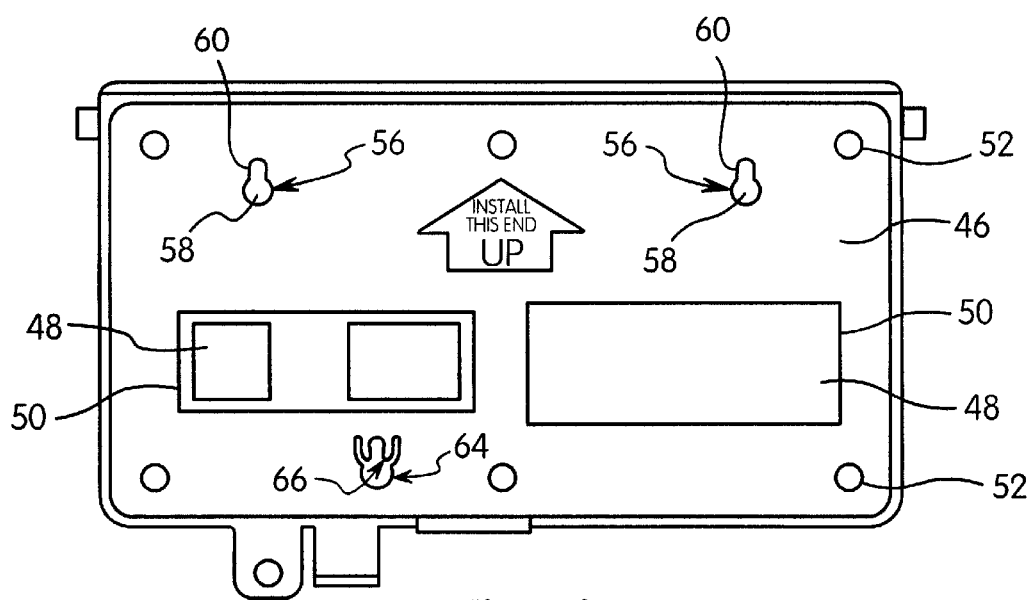
FIG. 4 is a bottom view of the device of FIG. 2 showing the mounting holes of the housing.
Figure 9:
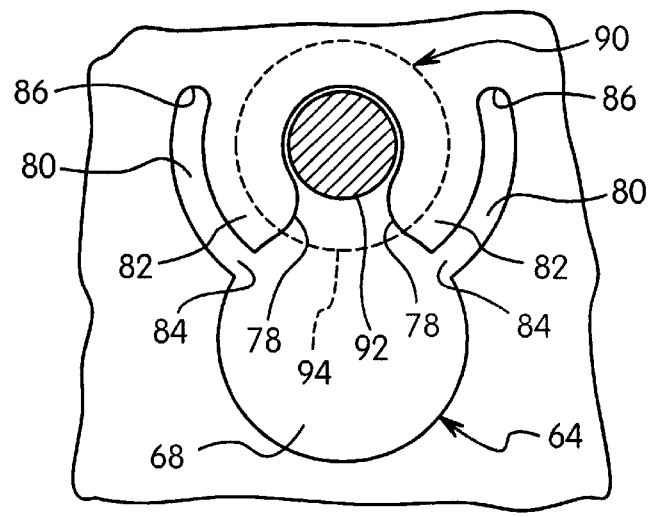
FIG. 9 is a top plan view of the mounting hole showing the fastener in cross-section in the second position.

Top wall 22 in the illustrated embodiment supports electrical devices such as an electrical switch 32 and an electrical receptacle 34. FIG. 2 shows an alternative embodiment of a housing 36. Housing 36 is similar to housing 20 and includes a top wall 38 and a pivotally mounted cover 40. Top wall 38 supports electrical devices such as an electrical receptacle 42 and a timer 44. Housing 36 includes a bottom wall 46 as shown in FIG. 4.

Referring to FIG. 3, bottom wall 26 in the illustrated embodiment functions as a mounting surface to mount housing 20 to a support surface (not shown). The support surface is typically a wall, pole or other vertical surface. In preferred embodiments, bottom wall 26 has a contour corresponding to the contour of the intended support. For purposes of illustration, bottom wall 26 is substantially flat for mounting to a flat wall.

Housing 20 is preferably made of a molded plastic by injection molding processes as known in the art. The plastic material is preferably a rigid plastic that is able to provide sufficient strength to the housing while allowing some flexibility to various components of the housing. An example of a suitable plastic is available from General Electric Company under the trademark Noryl®.

Referring to FIG. 3, bottom wall 26 of housing 20 is a substantially flat planar surface having several knock out plates 48 as known in the art. Knock out plates 48 are formed by frangible lines 50. One or more knock out plates 48 can be removed to provide access to the interior of housing 20 for feeding wires and cables into housing 20. Several circular-shaped apertures 52 are provided along each side edge 54 of bottom wall 26. A screw or other fastener can be passed through each aperture 52 for securing housing 20 to a support surface.

In the embodiment illustrated two keyhole-shaped openings 56 are provided at an upper end of housing 20. Keyhole openings 56 have a substantially conventional shape with a large circular open portion 58 and a smaller open portion 60 extending in a direction toward a top end of housing 20. Large open portion 58 of each keyhole opening 56 is dimensioned to receive the head of a screw or other fastener that extends from a support surface. Small open portion 60 of each keyhole opening 56 has a dimension corresponding substantially to the cross-sectional dimension of a shaft of the screw or other fastener. In preferred embodiments, small open portion 60 is defined by side edges 62 that are spaced apart a distance to frictionally engage the shaft of the mounting fastener. In FIG. 3, side edges 62 of small open portion 60 are substantially parallel to each other and extend from large open portion 58 to a semicircular end 63. Housing 20 is mounted to the support surface by passing the head of the fastener through the large open portion 58 and sliding housing 20 in a generally downward direction so that the shank of the fastener slides into the small open portion 60. The enlarged head of the fastener retains the housing 20 to the support surface. Bottom wall 46 of housing 36 shown in FIG. 4 is similar to bottom wall 26 and includes identical keyhole-shaped openings 56 and knockouts 48.

Bottom wall 26 of housing 20 includes at least one opening 64 having an indicator 66 for indicating the position of a fastener within opening 64. In the embodiment illustrated, a single opening 64 is provided in the bottom wall 26 adjacent a lower end and opposite keyhole shaped openings 56.

Referring to FIGS. 5–10, opening 64 is formed in bottom wall 26 and has a generally keyhole shape defined by a first open portion 68 and a second open portion 70. As shown in FIG. 5, first portion 68 is larger than second portion 70. In preferred embodiments, first open portion 68 has a generally circular shape with a concave inner edge 72. Second open portion 70 also has a substantially circular shape with a concave inner edge 74. First open portion 68 is connected to second open portion 70 by a neck 76 defining a constricted area. As shown in FIG. 5, neck 76 has a width that is less than the width of first open portion 68 and second open portion 70. The constricted area of neck 76 is formed by inwardly facing convex surfaces 78 extending between first open portion 68 and second open portion 70.

Preferably, bottom wall 26 is formed of a plastic material that is sufficiently flexible to allow limited movement of neck portion 76 and is resilient to spring back to its original position. Neck portion 76 is able to flex outward in the plane of bottom wall 26 as the shaft of a screw snaps between first open portion 68 and second open portion 70. The resilience of neck portion 76 functions as an indicator that the screw is seated in second open portion 70.

As shown in FIG. 5, a channel 80 defining a slot extends from opposite sides of first open portion 68 along opposite sides of neck 76 to define a pair of arms 82. Arms 82 are cantilevered with respect to bottom wall 26 and extend into opening 64 in the plane of bottom wall. In a preferred embodiment, each channel 80 extends in a direction generally parallel to second open section 70. Each channel 80 has a first open end 84 that is open to first open portion 68 adjacent neck 76. Each channel 80 has a second closed end 86 spaced from first end 84. Channel 80 has a width to define a relief area to allow arms 82 to flex slightly in the plane of bottom wall 26.

In the embodiment illustrated, channels 80 have a generally arcuate shape and extend in an arc coaxial with second open portion 70. In further embodiments, channels 80 can extend in a substantially straight line. Each channel 80 is spaced from convex surface 78 of neck 76 and terminates at second closed end 86 spaced from second open portion 70 to define a base 88 of each arm 82. Each base 88 has a width sufficient to allow the respective arm 82 to flex toward channel 80 and to define a hinge portion of each arm 82.

Arms 82 have an outer surface with a convex shaped portion defining outer convex surfaces 78 of neck portion 76 and a concave portion conforming to the inner edge 74 of second open portion 70. As shown in FIG. 5, channels 80 form a substantially convex shaped inner surface 83 of each arm 82 complimenting the shape of the outer surface.

Figure 10:
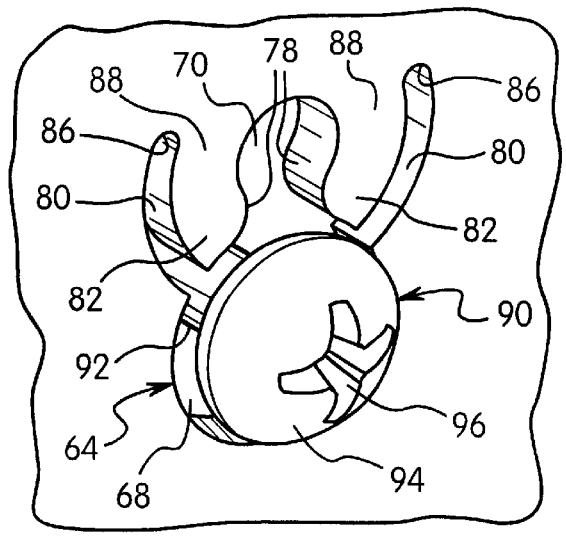
FIG. 10 is a perspective view of the mounting hole showing the fastener in a first position.
Figure 11:
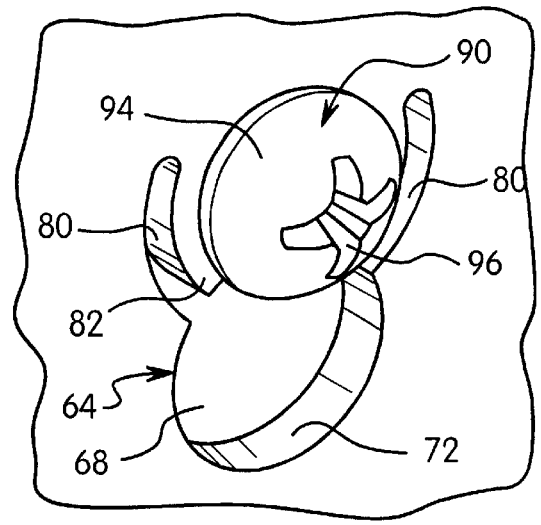
FIG. 11 is a perspective view of the mounting hole showing the fastener in a second position.

Referring to FIG. 7, a fastener 90 having a shaft 92 and a head 94 extending from a wall or other support surface passes through first open portion 68 of opening 64 for mounting housing 20 to the wall. In the embodiment illustrated, fastener 90 is a screw having a Phillips-type recess 96 in head 94 as shown in FIGS. 10 and 11. Shaft 92 extends from wall a distance so that head 94 can be positioned within housing 20.

As shown in FIG. 7, head 94 has an outer dimension slightly less than the inner dimension of first open portion 68 and greater than the inner dimension of second open portion 70. Shaft 92 has an outer dimension slightly less than or equal to the inner dimension of second open portion 70. Preferably, neck 76 has a width slightly less than the outer dimension of shaft 92.

Housing 20 is mounted to a support by fastener 90 by positioning bottom wall 26 on fastener 90 as shown in FIG. 7 and sliding housing 20 with respect to fastener 90 so that shaft 92 passes between neck 76 and into second open portion 70. Head 94 of fastener 90 is dimension to capture bottom wall 26 when shaft 92 is received in second open portion 70.

As shown in FIG. 8, shaft 92 causes arms 82 to flex in a generally outward direction in the plane of bottom wall 26 as shaft 92 slides through neck 76. Channels 80 provide a relief area to enable arms to flex away from shaft 92 in the plane of bottom wall 26 as shaft 92 passes between convex surfaces 78 of neck 76. Shaft 92 continues to pass through neck 76 to second open portion 70 so that arms 82 return to the original position. Arms 82 are sufficiently resilient to spring back to the original position and provide a snap capturing of shaft 92 in second open portion 70. Arms 82 and the space between convex surfaces 78 of neck 76 function as an indicator so that the installer can determine that shaft 92 is seated in second open portion 70. As shown, housing 29 is able to slide with respect to fastener 90 from a removable position shown in FIG. 7 to a locked and secured position shown in FIG. 9. The resilience of arms 82 is able to grip shaft 92 of fastener 90 when shaft 92 is seated in second open portion 70.

In the embodiment illustrated, a single opening having an indicator is provided in the bottom wall 26 of device 10. In further embodiments, more than one opening with an indicator can be provided depending on the intended use of the device and the mounting surface.

While various embodiments have been chosen to illustrate the invention, it will be appreciated by those skilled in the art that various modifications and additions can be made to the device without departing from the scope of the invention as defined in the appended claims.

What is claimed is:

1. A support member comprising:
   a mounting wall having an opening dimensioned for receiving a fastener for mounting said support member to a support surface, said fastener having a shank and a head, said opening having a substantially keyhole shape with a first open portion having a dimension to receive said head and a second open portion having a dimension to receive said shank, wherein said second open portion has a dimension less than the dimension of said first open portion; and
   at least one arm extending into said opening and being positioned at a juncture between said first open portion and said second open portion to form a constricted area therebetween having a width less than a width of said shank, said arm being sufficiently resilient to allow said shank to slide in a plane of said mounting wall between said first open portion and said second open portion.

2. The support member of claim 1, wherein said arm is cantilevered, and has a first end integrally formed with said wall and a second end extending into said opening.

3. The support member of claim 2, wherein said first end of said arm forms a hinge portion to enable said arm to move in a plane of said opening and said wall.

4. The support member of claim 2, wherein said wall includes a slot extending from said opening to form a relief area and to allow said arm to flex as said shank slides between said first open portion of said opening and said second open portion of said opening.

5. The support member of claim 1, comprising two of said arms, each of said arms having a first end integrally formed with said mounting wall and a second end defining said constricted area, each of said arms being cantilevered and flexible in a plane of said opening and said wall.

6. The support member of claim 5, said mounting wall having a slot extending from said opening adjacent each of said arms, each of said slots forming a relief area allowing flexing of said arms.

7. The support member of claim 6, wherein said slot s have an open end in said first o pen portion of said opening and extend in a direction toward said second open portion.

8. The support member of claim 7, wherein each of said arms have an inner concave surface facing said opening and an outer convex surface facing a respective slot.

9. The support member of claim 8, wherein each of said slots has an arcuate shape extending in an arc about a central axis of said second open portion of said opening.

10. The support member of claim 5, wherein said arms are resilient and flex to enable said shank to slide between said first open portion and said second open portion and to enable said arms to return to a static position to grip said shank.

11. A support for electrical components, comprising:
a housing having a mounting wall with at least one opening dimensioned to receive a mounting member for coupling said housing to a support surface; and
at least one arm integrally formed with said mounting wall and extending into said at least one opening, said arm being sufficiently flexible to flex as said mounting member passes between said arm and a side edge of said opening.

12. The support of claim 11, wherein said at least one arm has a first surface facing inward with respect to said opening, said first surface having a shape complementing a shape of an outer surface of said mounting member.

13. The support of claim 12, wherein said first surface of said arm is concave.

14. The support of claim 13, wherein said mounting wall includes a slot extending from said opening adjacent said arm, and wherein said arm has a second surface opposite said first surface and facing said slot, said slot being dimensioned to allow limited flexing of said arm in a plane of said mounting wall.

15. The support of claim 14, wherein said second surface of said arm has a substantially convex shape.

16. The support of claim 11, wherein said at least one arm comprises a first arm and a second arm extending into said opening.

17. The support of claim 16, wherein said first and second arms are spaced apart a distance to grip said mounting member.

18. The support of claim 16, wherein each of said first and second arms have an inner substantially concave surface, said concave surfaces having a shape to complement an outer surface of said mounting member.

19. The support of claim 16, wherein said opening has a first open portion spaced from said first and second arms and a second open portion between said first and second arms, said first open portion having a dimension greater than said second open portion.

20. The support of claim 19, wherein each of said first and second arms have an outer end forming a neck positioned between said first open portion and said second open portion.

21. The support of claim 20, wherein said first open portion and said second open portion each have a substantially circular shape.

22. The support of claim 11, wherein said at least one arm has an inner surface facing inward with respect to said at least one opening for retaining said mounting member in said at least one opening.

23. The support of claim 22, wherein said at least one arm can be deflected outwardly with respect to said at least one opening.

24. A housing for electrical components, comprising:
a housing body having a mounting wall, said mounting wall having at least one opening dimensioned to receive a mounting member; and
a yieldable arm member integrally formed with said mounting wall and extending into said opening, said yieldable arm member being sufficiently flexible to provide a tactile sensation when said housing slides to a secured position on the mounting member.

25. The housing of claim 24, further comprising a pair of said arm members, each said arm members being dimensioned to engage opposite side of the mounting member.

26. The housing of claim 25, wherein said arm members are resilient to grip opposite sides of the mounting member.

27. The housing of claim 26, wherein said opening comprises a first open portion and a second open portion, said first open portion being larger than said second open portion, said first open portion being dimensioned to receive a head portion of said mounting member therethrough, said second open portion including said arm members, said arm members being spaced apart a distance to receive and hold a shank portion of the mounting member therebetween.

28. The housing of claim 24, wherein said opening defines a keyhole shaped periphery.

29. The housing of claim 24, wherein said housing is made of plastic.

30. The housing of claim 24, wherein said yieldable arm deflects outwardly with respect to said at least one opening in a plane of said mounting wall to provide said tactile sensation.

31. The housing of claim 30, wherein said mounting wall includes a slot extending adjacent said yieldable arm, said slot forming a relief area allowing flexing of said at least one arm in a plane of said mounting wall.

32. An assembly for supporting electrical components, comprising:
a mounting member having a head portion and a shank portion;
a housing having at least one opening, a pair of resilient arms integrally formed with said housing and extending into said opening, said arms being spaced apart a distance to receive said shank portion of said mounting member.

33. The assembly of claim 32, wherein said head portion is disposed within said housing and said shank portion is disposed in said opening of said housing.

34. The combination of claim 32, wherein said arm members are sufficiently resilient to provide a tactile sensation when the shank portion of the mounting member slides between said arms in a plane of said arm members.

35. The assembly of claim 32, wherein each of said arms can be deflected outwardly with respect to said at least one opening and in a plane of said opening.

36. The assembly of claim 35, wherein said housing includes a slot adjacent each of said arms for forming a relief area allowing flexing of said arms into said relief area.

* * * * *